March 12, 1968 L. J. MILLER 3,372,710
SINGLE HANDLE FAUCET VALVE
Filed March 17, 1966
3 Sheets-Sheet 1
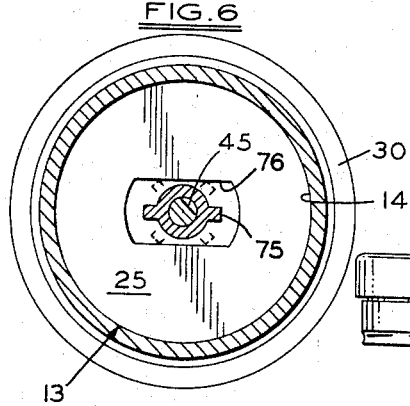
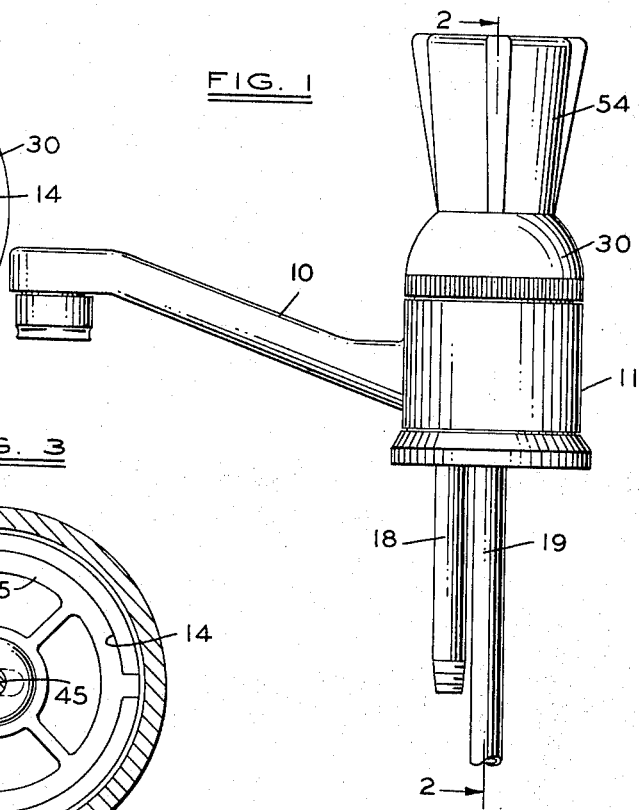
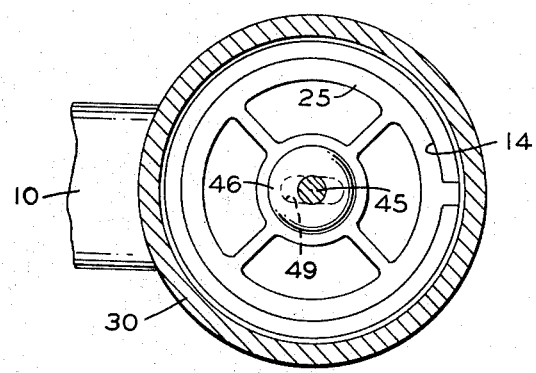
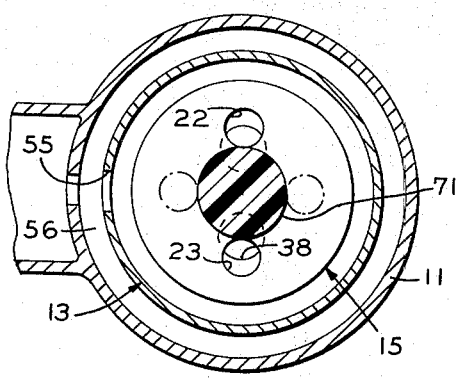
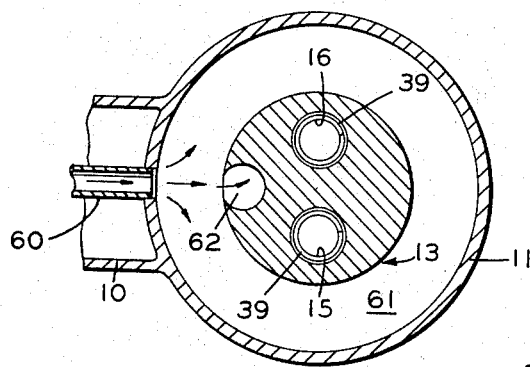
INVENTOR.
LARRY J. MILLER
BY
ATTORNEYS INVENTOR.
LARRY J. MILLER
BY
Barnes, Kisselle, Raisch & Choate
ATTORNEYS March 12, 1968
L. J. MILLER
3,372,710
SINGLE HANDLE FAUCET VALVE
Filed March 17, 1966
3 Sheets-Sheet 3
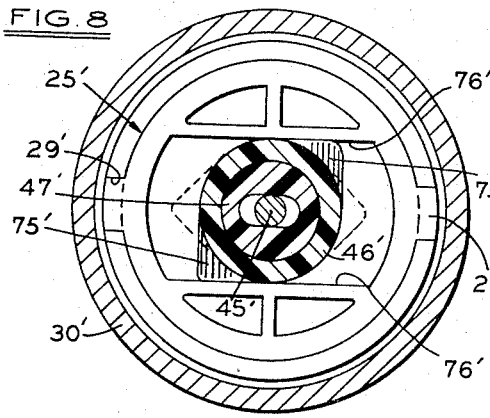
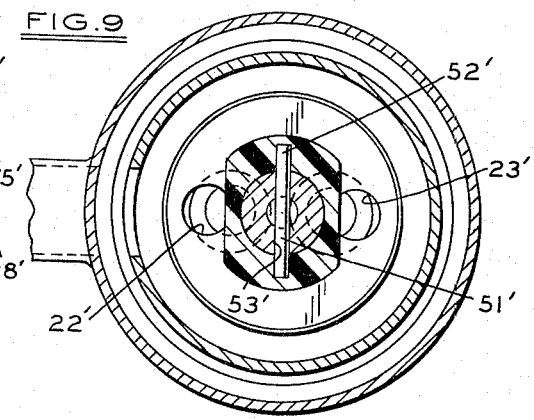
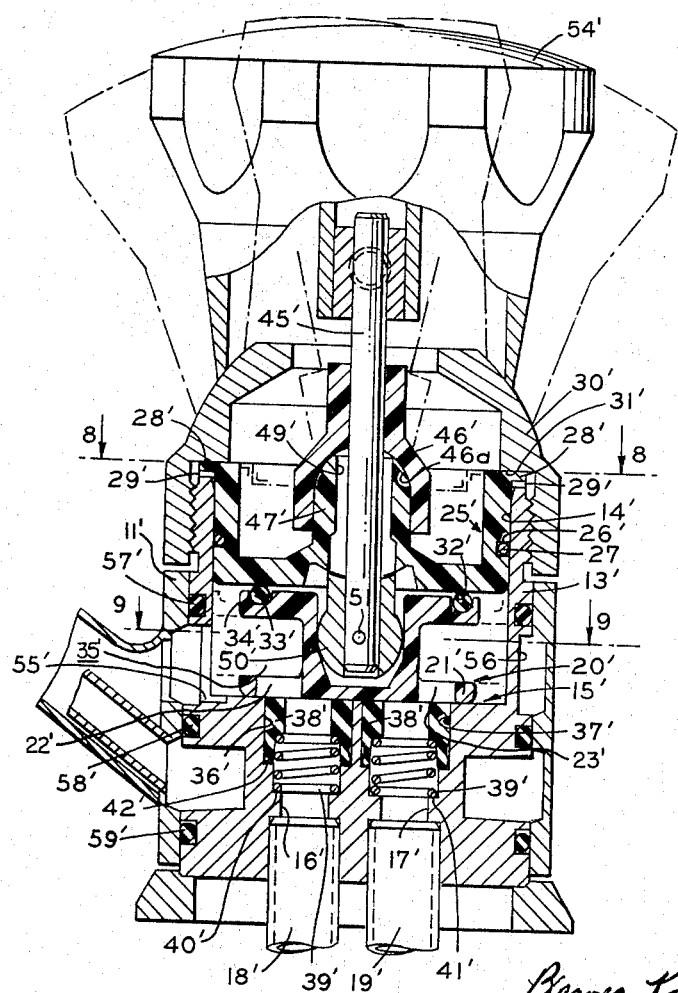
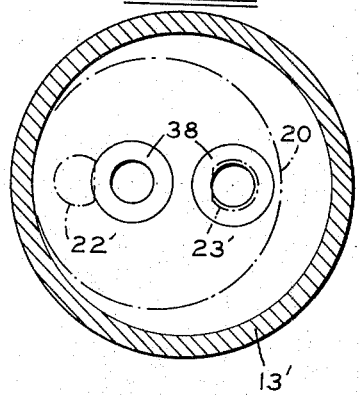
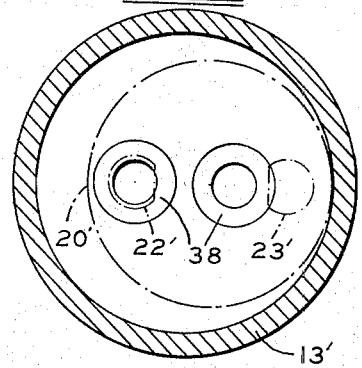
INVENTOR
LARRY J. MILLER
BY
*Barnes, Kaisselle, Raisch & Choate*
ATTORNEYS

United States Patent Office 3,372,710
Patented Mar. 12, 1968

3,372,710
SINGLE HANDLE FAUCET VALVE
Larry J. Miller, 3810 Shoals, Drayton Plains, Mich. 48020
Continuation-in-part of application Ser. No. 456,311, May 17, 1965. This application Mar. 17, 1966, Ser. No. 537,257
29 Claims. (Cl. 137—636.3)

ABSTRACT OF THE DISCLOSURE

The single handle faucet valve disclosed herein comprises a body defining a chamber having a flat wall surface with hot and cold water inlets extending through the surface. A control disc with a complementary flat surface is provided in contact with the flat wall surface of the chamber and has spaced openings therein movable into and out of registry with the inlet openings. A sealing member is provided adjacent the control member and sealing means on the control member are interposed between the sealing member and control member. A lever is journalled for rotation in the sealing member and has an end thereof interconnected with the control member. Means are provided for limiting the movement of the lever to a reciprocating motion in a single plane at an angle to the flat surface of the chamber.

---

This application is a continuation-in-part of my co-pending application Ser. No. 456,311, filed May 17, 1965, now abandoned.

Among the objects of this invention are to provide a single handle faucet valve that efficiently controls the mixing of hot and cold water; which is relatively low in cost; which is relatively free of maintenance; which is lightweight;and which can be readily assembled and disassembled for service.

In the drawings:

FIG. 1 is a side elevational view of a faucet embodying the invention.

FIG. 3 is a fragmentary sectional view taken along the line 3—3 in FIG. 2.

FIG. 4 is a fragmentary sectional view taken along the line 4—4 in FIG. 2, showing the spout in a different operative position.

FIG. 5 is a fragmentary sectional view taken along the line 5—5 in FIG. 2.

FIG. 6 is a fragmentary sectional view taken along the line 6—6 in FIG. 2.

FIG. 7 is a fragmentary sectional view similar to FIG. 2 of a modified form of the invention.

FIG. 8 is a fragmentary sectional view taken along the line 8—8 in FIG. 7.

FIG. 9 is a fragmentary sectional view taken along the line 9—9 in FIG. 7.

FIGS. 10 and 11 are partly diagrammatic views showing the relative positions of the parts in different positions of the valve.

Figure 2:
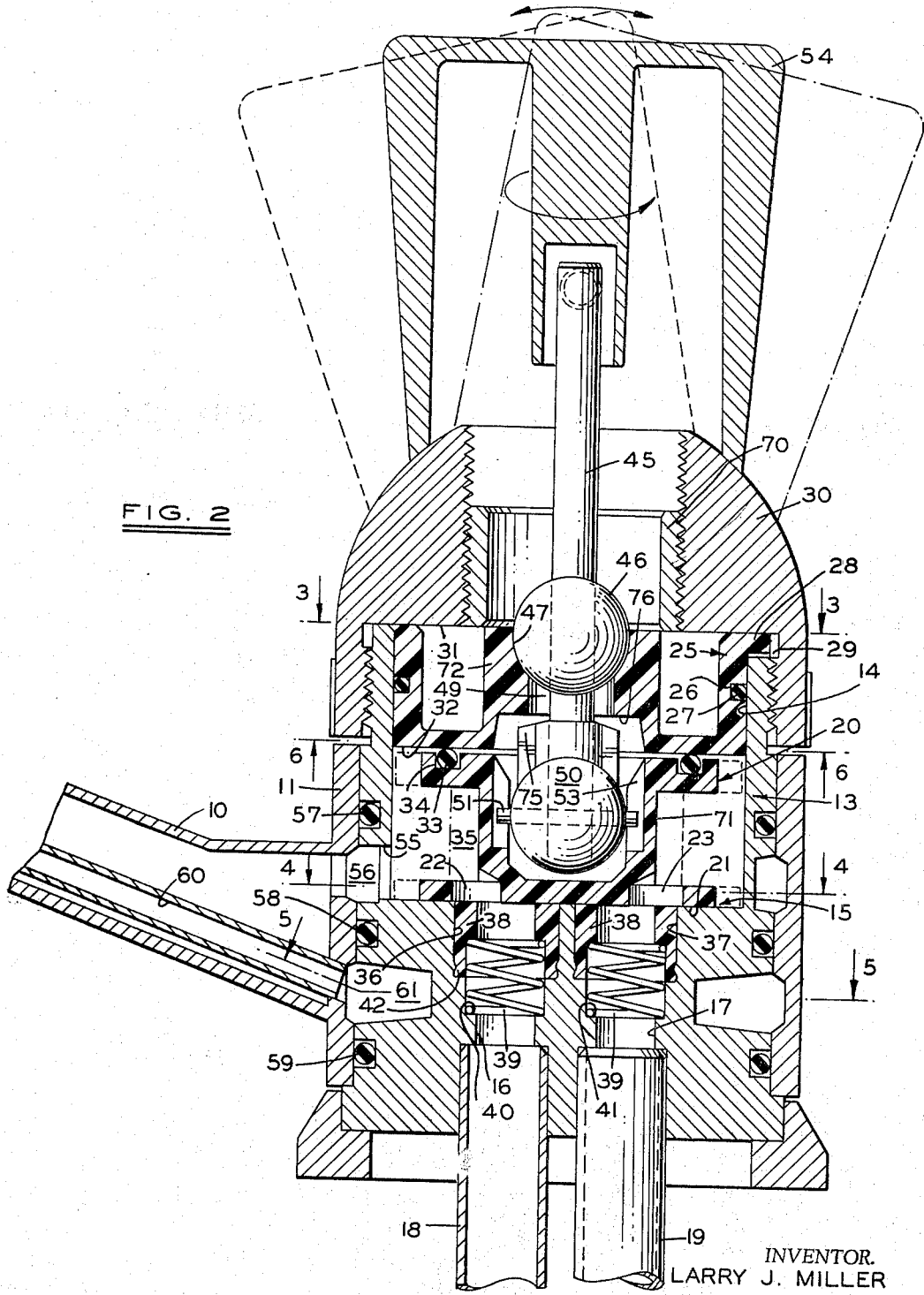
FIG. 2 is a fragmentary sectional view taken along the line 2—2 in FIG. 1 on a greatly enlarged scale with the spout extending in a different direction.

Referring to FIG. 1, the faucet valve embodying the invention is adapted to be used with various spout arrangements including the type shown in FIG. 1 wherein a spout 10 has a cylinder or sleeve 11 whereby it is rotatably mounted on the single handle faucet.

As shown in FIG. 2, the single handle faucet valve comprises a body 13 that is formed with a cylindrical chamber or opening 14 that opens upwardly through the upper end of the body. The bottom surface 15 of the chamber 14 is substantially flat and inlet passages 16, 17 extend upwardly from the bottom of the body 13 through the surface 15. Hot and cold water, respectively, are adapted to be supplied to the passages 16, 17 through inlet pipes 18, 19 that are swaged or otherwise provided in the openings.

A sealing disc 20 which is preferably made of a low friction plastic material that is rigid, non-deformable and resistant to hot water, such as Delrin, is provided in the chamber 14. Sealing disc 20 is formed with a substantially flat bottom surface 21 that engages the flat surface 15 of chamber 14. The disc is provided with circular openings 22, 23 that are adapted to be moved into registry with the upper ends of the openings 16, 17 as shown in FIG. 4 or out of registry as shown in dotted lines in FIG. 4.

A sealing member 25 is provided in the upper end of chamber 14 and has a peripheral circular groove 26 in which an O-ring 27 of resilient material such as synthetic rubber is provided to form a seal with the wall of the chamber 14. The upper end of the sealing member 25 is provided with a radial projection 28 that extends into a depression 29 in the body 13 and thereby prevents rotation of the sealing member 25. A head 30 is threaded on the upper end of the body 13 and has a surface 31 that engages the upper end of the sealing member 25 to retain the sealing member into position.

As further shown in FIG. 2, the underside 32 of the sealing member 25 is substantially flat and engages an O-ring 33 provided in a groove 34 in the substantially flat upper surface of the control disc 20. By this arrangement, the sealing member 25 yieldingly urges the control disc 20 and particularly the surface 21 of the control disc 20 into contact with the bottom surface 15 of chamber 14. A seal is thereby provided which permits water into the area 35 but prevents the flow of water beyond the O-ring 33 or the O-ring 27.

Further in accordance with the invention, the upper ends 36, 37 of the inlet passages 16, 17 are enlarged to receive an annular sealing member 38 of rubber or other suitable resilient material to provide a seal with the undersurface 21 of the sealing member 20. In order to insure this seal, coil springs 39 are compressed between shoulders 40 and 41 of the body and shoulders on the sealing rings 38. In addition, to insure that water will not seep between the surfaces of the enlarged openings 36, 37 and the respective sealing members 38, the lower end of each sealing member 38 is substantially circular in cross section as at 42 integral with the member to provide a secondary seal in the nature of an O-ring seal.

As shown in FIG. 2, a lever 45 in the form of a cylindrical stem is journalled in the sealing member 25 by a ball 46 that is preferably made of plastic, such as Delrin, and seats against a spherical seat 47. A passage 49 in the lower end of sealing member 25 is elongated in a single plane and has substantially the diameter of the lever 45 so that the lever can swing in only one plane but is rotatable about the axis thereof.

The lower end of the lever projects downwardly through passage 49 into the sealing member 25 and a second ball 50 is provided on the lower end of the lever and held thereon by a pin 51, the ends of which extend beyond the periphery of the ball. The ends 52 extend into vertical grooves or slots 53 and thereby interconnect the lower end of the lever with the control disc 20.

By this arrangement, swinging of the lever 45 in the single plane controlled by the slot or passage 49 causes the control disc 20 to move back and forth while rotation of the lever causes the control disc 20 to rotate in any position. A control knob 54 is provided on the upper end of the lever 45.

By rotating the control knob 54, the openings 22 in the control disc can be moved from position in registry with the inlet 16, 17 as shown in FIG. 4 in solid lines to a position out of registry, thereby controlling the amount of water flowing through the inlets into the chamber or space 35.

By swinging the lever back and forth, the extent of communication or registry of the openings 22, 23 with the passages 16, 17 is controlled. By moving the lever to the left or counterclockwise as shown in FIG. 2, substantially the entire opening 22 is brought into registry with the inlet passage 16 so that only hot water will flow. By swinging the lever to the right or clockwise as shown in FIG. 2, substantially the entire opening 23 is brought into registry with the inlet passage 17 so that only cold water will flow.

In order to limit the rotation of the control disc 20 to full-open or full-close position, the upper ball 46 has upwardly and outwardly extending ears 75 which are diametrically opposed and extend into a generally rectangular cavity 76 in the lower end of the sealing member 25 (FIG. 6). As the lever 45 is rotated, the ears 75 engage the sides of the cavity 76 to limit the rotation of the lever as shown in broken lines in FIG. 6.

As further shown in FIG. 2, the area 35 communicates through a passage 55 with an exterior annular groove 56 in the body that in turn communicates with the interior of the spout 10. A seal is provided between the cylindrical portion 11 of the spout and the outer surface of the valve body 13 by O-rings 57, 58, 59.

In accordance with well-known faucet valve construction, suitable means may be provided on the end of the spout 10 to return the water through a tube 60 to an annular passage 61 in the body and downwardly to an outlet 62 and in turn to a rinse tube. This arrangement forms no part of the present invention.

It can thus be seen that there has been provided a faucet valve wherein a relatively limited number of parts are provided, efficient control of hot and cold water is achieved and substantially no maintenance is required.

The various parts of the faucet valve are readily accessible by removing the head 30. In case wear or loss of resiliency occurs in the O-ring 33, a cylindrical control collar 70 is threaded into the upper end of the head 30 and is adapted to be threaded downwardly into engagement with the upper end of the control member 25 to increase the force of the control member against the O-ring 33.

As shown in FIG. 2, the disc 20 and control member 25 are preferably made of plastic material and have various portions thereof cut away as at 71, 72 to reduce the weight.

As shown in FIG. 7, this form of the single handle faucet valve comprises a body 13' that is formed with a cylindrical chamber or opening 14' that opens upwardly through the upper end of the body. The bottom surface 15' of the chamber 14' is substantially flat and inlet passages 16', 17' extend upwardly from the bottom of the body 13' through the surface 15'. Hot and cold water, respectively, are adapted to be supplied to the passages 16', 17' through inlet pipes 18', 19' that are swaged or otherwise provided in the openings.

A sealing disc 20' which is preferably made of a low friction plastic material that is rigid, non-deformable and resistant to hot water, such as Delrin, is provided in the chamber 14'. Sealing disc 20' is formed with a substantially flat bottom surface 21' that engages the flat surface 15' of chamber 14'. The disc is provided with D-shaped openings 22', 23' that are adapted to be moved into registry with the upper ends of the openings 16', 17'.

A sealing member 25' preferably made of the same plastic as sealing disc 20' is provided in the upper end of chamber 14' and has a peripheral circular groove 26' in which an O-ring 27' of resilient material such as synthetic rubber is provided to form a seal with the wall of the chamber 14. The upper end of the sealing member 25' is provided with radial projections 28' that extend into depressions 29' in the body 13' and thereby prevent rotation of the sealing member 25'. A head or cap 30' is threaded on the upper end of the body 13' and has a surface 31' that engages the upper end of the sealing member 25' to retain the sealing member into position.

As further shown in FIG. 7, the underside 32' of the sealing member 25' is substantially flat and engages an O-ring 33' provided in a groove 34' in the substantially flat upper surface of the control disc 20'. By this arrangement, the sealing member 25' urges the control disc 20' and particularly the surface 21' of the control disc 20' into contact with the bottom surface 15' of chamber 14'. A seal is thereby provided which permits water into the area 35' but prevents the flow of water beyond the O-ring 33' or the O-ring 27'.

Further in accordance with the invention, the upper ends 36', 37' of the inlet passages 16', 17' are enlarged to receive an annular sealing member 38' of rubber or other suitable resilient material to provide a seal with the undersurface 21' of the sealing member 20'. In order to insure this seal, coil springs 39' are compressed between shoulders 40' and 41' of the body and shoulders on the sealing rings 38'. In addition, to insure that water will not seep between the surfaces of the enlarged openings 36', 37' and the respective sealing members 38', the lower end of each sealing member 38' is substantially circular in cross section as at 42' integral with the member to provide a secondary seal in the nature of an O-ring seal.

As shown in FIG. 7, a lever 45' in the form of a cylindrical stem is journalled in the sealing member 25' by a collar 46' which has a spherical seat 46a engaging an upwardly extending spherical projection 47' on the sealing member 25'. The cross sectional configuration of the complementary portions of the collar 46' and lever 45' is D-shaped so that they are non-rotatable relative to one another. The passage in the projection 47' through which the lever extends is elongated in a single plane and has substantially the diameter of the lever 45' so that the lever is free to swing in only one plane but is rotatable about the axis thereof.

The lower end of the lever projects downwardly through passage 49' into the sealing member 25' and a ball 50' is provided on the lower end of the lever and held thereon by a pin 51', the ends 52' of which extend beyond the periphery of the ball 50' into vertical grooves or slots 53' and thereby interconnect the lower end of the lever with the control disc 20'.

By this arrangement, swinging of the lever 45' in the single plane controlled by the slot or passage 49' causes the control disc 20' to move back and forth while rotation of the lever causes the control disc 20' to rotate. A control knob 54' is provided on the upper end of the lever 45'.

By rotating the control knob 54', the openings 22' in the control disc can be moved from position in registry with the inlet 16', 17' as shown in FIG. 7 in solid lines to a position out of registry, thereby controlling the amount of water flowing through the inlets into the chamber or space 35'.

By swinging the lever back and forth, the extent of communication or registry of the openings 22', 23' with the passages 16', 17' is controlled. By moving the lever to the left or counterclockwise as shown in FIG. 7, substantially the entire opening 22' is brought into registry with the inlet passage 16' so that only hot water will flow (FIG. 11). By swinging the lever to the right or clockwise as shown in FIG. 7, substantially the entire opening 23' is brought into registry with the inlet passage 17' so that only cold water will flow (FIG. 10).

In order to limit the rotation of the control disc 20' to full-open or full-close position, the collar 46' is formed with diametrically extending ears 75' which are adapted to extend into engagement with generally flat side walls 76' in the upper end of the sealing member 25' (FIG. 8). As the lever 45' is rotated, the ears 75' engage the sides of the cavity 76' to limit the rotation of the lever. The diameter of the collar 46' in the vicinity of the walls 76' is substantially equal to the distance between the walls 76'.

As further shown in FIG. 7, the area 35' communciates through a passage 55' with an exterior annular groove 56' in the body that in turn communicates with the interior of the spout 10'. A seal is provided between the cylindrical portion 11' of the spout and the outer surface of the valve body 13' by O-rings 57', 58', 59'.

In accordance with well-known faucet valve construction, suitable means may be provided on the end of the spout 10' to return the water through a tube 60' to an annular passage 61' in the body and downwardly to an outlet 62' and in turn to a rinse tube. This arrangement forms no part of the present invention.

It can thus be seen that the form of the invention shown in FIGS. 7–12 differs from the form of the invention shown in FIGS. 1–6 in (1) the reversal of the socket and ball connection between the lever and sealing member, (2) the provision of the limitation of the rotation of the lever as being in the upper end of the sealing member rather than the lower end of the sealing member, (3) the elimination of the control collar 70 and (4) the changing of the openings in the valve member from a circular to a D-shaped configuration.

In each form of the invention, the faucet can be turned on or off without affecting the degree of registry of the control disc with the inlet passages.

Specifically, at any angular position of the handle, representing a specific water setting of either hot, cold or mixed hot and cold, the handle can be rotated to and from "on" and "off" position without affecting the water setting. In addition, the water setting can be made before the knot is rotated to "on" position.

I claim:

1. In a single handle faucet valve, the combination comprising:
    means defining a chamber,
    said chamber having a substantially flat wall surface along one wall,
    hot and cold water inlets extending through said surface to said chamber,
    a control disc having a complementary flat surface,
    said disc having spaced openings therein movable into and out of registry with said inlet openings,
    a sealing member spaced from said substantially flat sealing surface,
    sealing means interposed between said sealing member and said control member providing a seal therebetween and yieldingly urging said control member against said substantially flat surface,
    a lever,
    means for journalling said lever for rotation in said sealing member,
    means for guiding said lever for reciprocation in a substantially single plane only at an angle to the flat surface of the chamber,
    means interconnecting one end of said lever with said control disc so that rotation of said lever rotates said control disc and swinging of said lever moves said control disc in said single plane.

2. The combination set forth in claim 1 wherein said sealing means comprises an O-ring.

3. The combination set forth in claim 1 wherein each of said inlet openings has an annular sealing member engaging the complementary surface of said control disc.

4. The combination set forth in claim 1 wherein said means journalling said lever for rotation in said sealing member comprises a sphere fixed on said lever and a complementary spherical surface on said sealing member.

5. The combination set forth in claim 1 wherein said means for journalling said lever for rotation in said sealing member comprises a spherical projection on said sealing member and a complementary spherical seat on said lever.

6. The combination set forth in claim 1 wherein said control disc, said sealing member and said journalling means are made of low friction plastic material which is rigid, non-deformable and resistant to hot water.

7. In a single handle faucet valve, the combination comprising:
    a body having a substantially cylindrical chamber,
    said chamber having a substantially flat bottom surface,
    inlet passages extending from the bottom of said body upwardly to said substantially flat surface,
    a control disc having a complementary surface engaging said bottom surface of said chamber,
    said control disc having spaced openings therein adapted upon movement of said control disc to move into and out of communication with said inlet openings in the body,
    a sealing member positioned in said chamber,
    sealing means extending between the walls of said chamber and said sealing member,
    a head closing the upper end of said body and retaining said sealing member from movement outwardly of said body,
    said sealing member having a substantially flat surface,
    said control disc having a second surface complementary to said surface of said sealing member,
    sealing means extending between said complementary surfaces of said sealing member and said control disc,
    a lever,
    said head having an opening through which said lever extends with one end exteriorly of said head and the other end extending downwardly within said chamber of said body,
    means for journalling said lever for rotation within said sealing member,
    the lower end of said lever extending into said control disc,
    means for connecting the lower end of said lever to said control disc,
    and means for guiding said lever for movement in a single plane.

8. The combination set forth in claim 7 wherein said sealing means between said sealing member and said control disc comprises an O-ring.

9. The combination set forth in claim 7 wherein said sealing means between said sealing member and said body comprises an O-ring.

10. The combination set forth in claim 7 wherein said means for journalling said lever for rotation in said sealing member comprises a sphere fixed on said lever and a complementary spherical surface on said sealing member.

11. The combination set forth in claim 7 wherein said means interconecting the lower end of said lever and said control disc comprises a sphere fixed on said lever, and means interconnecting and projecting outwardly from said sphere into corresponding openings in said control disc.

12. The combination set forth in claim 11 wherein said last-mentioned means comprises a pin extending through said second-mentioned sphere and said lever, and axially extending grooves in said control disc engaged by the ends of said pin.

13. The combination set forth in claim 7 wherein said means for journalling said lever for rotation in said sealing member comprises a spherical projection on said sealing member, and a complementary member on said lever having a spherical seat engaging said spherical projection.

14. The combination set forth in claim 13 wherein said control disc, said sealing member and said complementary member on said lever are made of a low friction plastic material that is rigid, non-deformable and resistant to hot water.

15. The combination set forth in claim 7 including annular sealing members provided in the upper end of each said inlet openings and engaging the underside of the control disc.

16. The combination set forth in claim 15 including spring means yieldingly urging said last-mentioned sealing members upwardly.

17. The combination set forth in claim 7 including means movable axially in said head and engaging said sealing member to control the sealing force between said sealing member and said control disc.

18. In a single handle faucet valve, the combination comprising:
said chamber having a substantially flat wall surface along one wall,
hot and cold water inlets extending through said surface to said chamber,
a control disc having a complementary flat surface,
said disc having spaced openings therein movable into and out of registry with said inlet openings,
a sealing member spaced from said substantially flat sealing surface,
O-ring sealing means interposed between said sealing member and said control member providing a seal therebetween and yieldingly urging said control member against said substantially flat surface,
O-ring sealing means between said sealing member and the remaining walls of said chamber,
each of said inlet openings having an annular sealing member engaging the complementary surface of said control disc,
a lever,
means journalling said lever for rotation in said sealing member,
means for guiding said lever for reciprocation in a substantially single plane only,
means interconnecting one end of said lever with said control disc so that rotation of said lever rotates said control disc and swinging of said lever moves said control disc in said single plane.

19. In a single handle faucet valve, the combination comprising:
a body having a substantially cylindrical chamber opening to the upper end of said body,
said chamber having a substantially flat bottom surface,
inlet passages extending from the bottom of said body upwardly to said substantially flat surface,
a control disc having a complementary surface engaging said surface of said body,
said control disc having spaced openings therein adapted upon movement of said control disc to move into and out of communication with said inlet openings in the body,
a sealing member positioned in said chamber,
O-ring type sealing means extending between the walls of said chamber and said sealing member,
a head closing the upper end of said chamber in said body and retaining said sealing member against movement outwardly of said body,
said sealing member having a substantially flat bottom surface,
said control disc having a surface complementary to said surface of said sealing member,
O-ring type sealing means extending between said surfaces of said sealing member and said control disc,
a lever,
said head having an opening through which said lever extends with one end exteriorly of said head and the other end extending downwardly within said chamber of said body,
said sealing member having a spherical sealing surface in the upper end thereof,
a first ball on said lever intermediate its ends and engaging said seal in said sealing member to journal said lever for rotation within said sealing member,
the lower end of said lever extending through said sealing member into said control disc,
a second ball on the lower end of said lever,
interengaging means between said second ball and said control disc interconnecting said second ball and said lever,
said sealing member having a radially elongated slot through which said lever extends to guide said lever for movement in a single plane.

20. The combination set forth in claim 19 wherein said interengaging means comprises a pin extending through said second sphere and said lever,
and axially extending grooves in said control disc engaged by the ends of said pin.

21. The combination set forth in claim 19 including annular sealing members provided in the upper end of each said inlet openings and engaging the underside of the control disc.

22. The combination set forth in claim 19 including means for limiting the rotational movement of said control disc.

23. The combination set forth in claim 22 wherein said last-mentioned means comprises radially extending ears on said second ball,
said sealing member having a non-circular opening in the underside thereof into which said ears extend and against the side walls of which the ears engage to limit the rotational movement of the control disc.

24. The combination set forth in claim 19 including a delivery spout having a generally cylindrical wall attached thereto,
said wall being telescoped over said body,
O-ring type sealing means interposed between the inner surface of said cylindrical wall and the outer surface of said body.

25. The combination set forth in claim 19 including a collar threaded into said head and adapted to engage the top surface of said sealing member for controlling the sealing force between said sealing member and said control disc.

26. In a single handle faucet, the combination comprising:
a body having a substantially cylindrical chamber opening to the upper end of said body,
said chamber having a substantially flat bottom surface,
inlet passages extending from the bottom of said body upwardly to said substantially flat surface,
a control disc having a complementary bottom surface engaging said surface of said body,
said control disc having spaced openings therein adapted upon movement of said control disc to move into and out of communication with said inlet openings in the body,
a sealing member positioned in said chamber,
O-ring type sealing means extending between the walls of said chamber and said sealing member,
a head closing the upper end of said chamber in said body and retaining said sealing member against movement outwardly of said body,
said sealing member having a substantially flat bottom surface,
said control disc having a top surface complementary to said surface of said sealing member,
O-ring type sealing means extending between said complementary surfaces of said sealing member and said control disc,
a lever,
said head having an opening through which said lever extends with one end exteriorly of said head and the other end extending downwardly within said chamber of said body,
said sealing member having an upwardly extending spherical projection having an opening through which said lever extends, said opening in said projection being elongated to guide said lever for movement in a single plane, a complementary member on said lever having a spherical seat engaging the spherical projection on said sealing member, the lower end of said lever extending through said opening in said sealing member into said control disc, a ball member on the lower end of said lever, and interengaging means between said ball member and said control disc interconnecting said ball and said control disc.

27. The combination set forth in claim 26 wherein said control disc, said sealing member, said complementary member on said lever and said ball member are made of low friction plastic material which is rigid, non-deformable and resistant to hot water.

28. The combination set forth in claim 26 including means limiting the rotational movement of said control disc.

29. The combination set forth in claim 28 wherein said last mentioned means comprises radially extending projections rotatable with said control disc and stop means on said sealing member engageable by said projections.

References Cited
UNITED STATES PATENTS

| | | | |
|---|---|---|---|
| 2,977,986 | 4/1961 | Hinerer | 137—636.2 X |
| 3,023,784 | 3/1962 | Monson | 137—636.2 X |
| 3,056,418 | 10/1962 | Adams | 251—172 X |
| 3,250,296 | 5/1966 | Perlman | 137—636.3 X |
| 3,254,669 | 6/1966 | Perlman | 137—636.3 X |

CLARENCE R. GORDON, *Primary Examiner.*